United States Patent
Sachidanandam et al.

(10) Patent No.: US 12,450,156 B1
(45) Date of Patent: Oct. 21, 2025

(54) OPTIMIZING CACHING OF A LOGICAL-TO-PHYSICAL (L2P) TRANSLATION TABLE IN STORAGE DEVICES

(71) Applicant: Sandisk Technologies, Inc., Milpitas, CA (US)

(72) Inventors: Agalya Sachidanandam, Bengaluru (IN); Pavithra Padmanabha, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/781,280

(22) Filed: Jul. 23, 2024

(51) Int. Cl.
*G06F 12/02* (2006.01)
*G06F 9/50* (2006.01)

(52) U.S. Cl.
CPC .......... *G06F 12/0246* (2013.01); *G06F 9/505* (2013.01); *G06F 12/0292* (2013.01)

(58) Field of Classification Search
None
See application file for complete search history.

(56) References Cited

U.S. PATENT DOCUMENTS

| | | | |
|---|---|---|---|
| 8,335,907 B2 | 12/2012 | Sinclair | |
| 10,459,636 B2 | 10/2019 | Frid | |
| 10,922,235 B2 | 2/2021 | Navon | |
| 11,199,983 B2 | 12/2021 | Frid | |
| 2023/0280919 A1 | 9/2023 | Moshe | |
| 2023/0385200 A1* | 11/2023 | Agarwal | G06F 11/1048 |
| 2025/0217284 A1* | 7/2025 | Konan | G06F 12/0246 |

* cited by examiner

*Primary Examiner* — Kevin Verbrugge
(74) *Attorney, Agent, or Firm* — Arlene Neal; NEAL BLIBO LLC (57) ABSTRACT

A storage device may optimize consolidation of a logical to physical (L2P) table stored on a volatile memory. A controller may execute a request to store data to a memory device and add a new L2P mapping to the L2P table. The controller may increment a global counter and a local counter associated with a region in the L2P table when data associated with the region is added on the memory device. The controller may select the region in the L2P table for consolidation during a background operation based on a background threshold or during a foreground operation based on a foreground threshold. In selecting the region, the controller may select the region if the difference between the global counter and the local counter is greater than a counter threshold. The controller may consolidate the selected region.

20 Claims, 7 Drawing Sheets

FIG. 1

| REGION | uITEM | TIME 0 | TIME 1 | TIME 2 | TIME 3 | TIME 4 |
|---|---|---|---|---|---|---|
| 0 | 1 | | | | | |
| 1 | 1 | | | ///  | | |
| 2 | 1 | | /// | /// | /// | /// |
| 3 | 1 | | /// | /// | /// | |
| ... | 1 | | /// | /// | | |
| 31 | 1 | | /// | | | |
| ... | 1 | | | | | |
| 225 | 1 | | | | | |

L2P TABLE

OPTIMIZING CACHING OF A LOGICAL-TO-PHYSICAL (L2P) TRANSLATION TABLE IN STORAGE DEVICES

BACKGROUND

A storage device may be communicatively coupled to a host and to non-volatile memory including, for example, a NAND flash memory device on which the storage device may store data received from the host. The NAND flash memory may be divided into blocks and the storage device may store data in blocks on the memory device. The storage device may program, read, and/or erase data stored on the memory device and when data is programmed on the memory device, the data may be assigned logical block addresses (LBAs) that may be mapped one-to-one to physical addresses on the memory device. The one-to-one LBA to physical address mappings may be stored in a logical-to-physical (L2P) table that may be buffered on a volatile random-access memory (RAM) on the storage device.

A controller on the storage device may process background operations, including garbage collection, to manage the resources on the storage device. In managing the resources of the storage device, the controller may move data from one location to another on the memory device to optimize how space on the memory device is used and improve efficiency. In moving data around on the memory device, the physical block addresses associated with the data change and a write amplification factor (WAF) (i.e., a value representing the amount of data the controller writes relative to the amount of data submitted by the host) increases.

To properly translate from LBAs to physical block addresses and correctly access data stored on the memory device, the L2P data may be retained throughout the life of the storage device. To ensure that the information in the L2P data is not lost, for example, during a power reset of the storage device, the data from the L2P table may go through consolidation (i.e., a process where the data from the L2P table may be flushed/copied from the RAM to the memory device after a predefined time period and/or after a predefined condition occurs). The frequency of the consolidation may be directly proportional to the WAF of the block on the memory device storing the L2P mappings, wherein less consolidation equals a lower WAF.

To efficiently retrieve a mapping from the L2P table, the L2P table may include data structures that may be easily searched. For example, the L2P table may be divided into regions and a region may include a mSet (i.e., a group of mapping entries). Each time data is programmed or relocated on the memory device, a mapping for that data may be created to capture the mapping of the new physical block address to LBA association and a new mSet may be added to the associated region. When data in the L2P table is consolidated to the memory device, the region(s) with the highest number of mSets may be selected to be copied to the memory device and the space on the RAM storing the consolidated mSets may be freed up. This selection process may cause those regions that are not updated frequently and thus have a low number of mSets to not get consolidated to the memory device or to be consolidated after a long period. The mSets in these regions that are not consolidated may be trapped in the RAM and the space in the RAM occupied by the trapped mSets may not be freed. Even though the regions having trapped mSets may have fewer number of mSets updates and may occupy less space, retaining trapped mSets in the uLayer (i.e., space in the RAM) indefinitely or for long periods of time may reduce the overall capacity of the storage device. If, for example, the frequency of the consolidation is based on the overall space in the uLayer, trapped mSets may cause frequent consolidation of regions having a high number of mSet updates, increasing the WAF of the block in the memory device that stores the L2P mappings.

To ensure that trapped mSets get consolidated on a timely basis, one approach may scan the blocks on the memory device that are set aside to store mSet updates from oldest to newest. Based on the scan, the storage device may determine which of the mSets have not been written to the blocks on the memory device or have not been written for a predefined period and are thus trapped mSets. The storage device may search for these mSets in the RAM and select the trapped mSets to be flushed to the memory device. This approach may be more time consuming and costly as it requires reading the blocks on the memory device.

SUMMARY

In some implementations, the storage device may optimize consolidation of a logical to physical (L2P) table. The storage device may include a memory device divided into blocks and a volatile memory including a L2P table to store mappings of logical block addresses associated with data to physical block addresses on the memory device. The storage device may also include a controller to execute a request to store data to a memory device, map a logical block address associated with the data to a physical block address on the memory device, and to add a new L2P mapping to the L2P table. When data is added to or moved on the memory device and the controller adds a new L2P mapping to the L2P table, the controller may increment a first counter and a second counter. The controller may select a region in the L2P table and associated with the second counter for consolidation when a criterion is met based on the values of the first counter and the second counter and a counter threshold and the controller may consolidate the selected region.

In some implementations, a method is provided for optimizing consolidation of a logical to physical (L2P) table in a storage device. The method includes executing a request to store data to a memory device, mapping a logical block address in the data to be stored on the memory device to a physical block address on the memory device and adding a new L2P mapping to a L2P table stored in a volatile memory on the storage device. The method also includes incrementing a first counter and a second counter when data is one of added to and moved on the memory device. The method further includes selecting a region in the L2P table and associated with the second counter for consolidation when a criterion is met based on the values of the first counter and the second counter and a counter threshold and consolidating the selected region.

In some implementations, a method is provided for optimizing consolidation of a logical to physical (L2P) table in a storage device. The method includes executing a request to store data to a memory device, mapping a logical block address in the data to be stored on the memory device to a physical block address on the memory device and adding a new L2P mapping to a L2P table stored in a volatile memory on the storage device. The method also includes incrementing a global counter and a local counter when data is one of added to and moved on the memory device. During a background operation, the method includes identifying a region for consolidation based on a background threshold, comparing a difference between the global counter and the local counter associated with the region with a counter threshold, and if the difference is greater than the counter threshold, determining that the region includes a trapped mSet, and selecting the region for consolidation as part of the background operation. During a foreground operation, the method includes identifying a region for consolidation based on a foreground threshold, comparing a difference between the global counter and the local counter associated with the region with the counter threshold, and if the difference is greater than the counter threshold, determining that the region includes a trapped mSet, and selecting the region for consolidation as part of the foreground operation. The method also includes consolidating the region.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present disclosure.

The apparatus and method components have been represented where appropriate by conventional symbols in the drawings, showing those specific details that are pertinent to understanding the implementations of the present disclosure so as not to obscure the disclosure with details that will be readily apparent to those of ordinary skill in the art.

DETAILED DESCRIPTION OF THE INVENTION

The following detailed description of example implementations refers to the accompanying drawings. The same reference numbers in different drawings may identify the same or similar elements.

Figure 1:
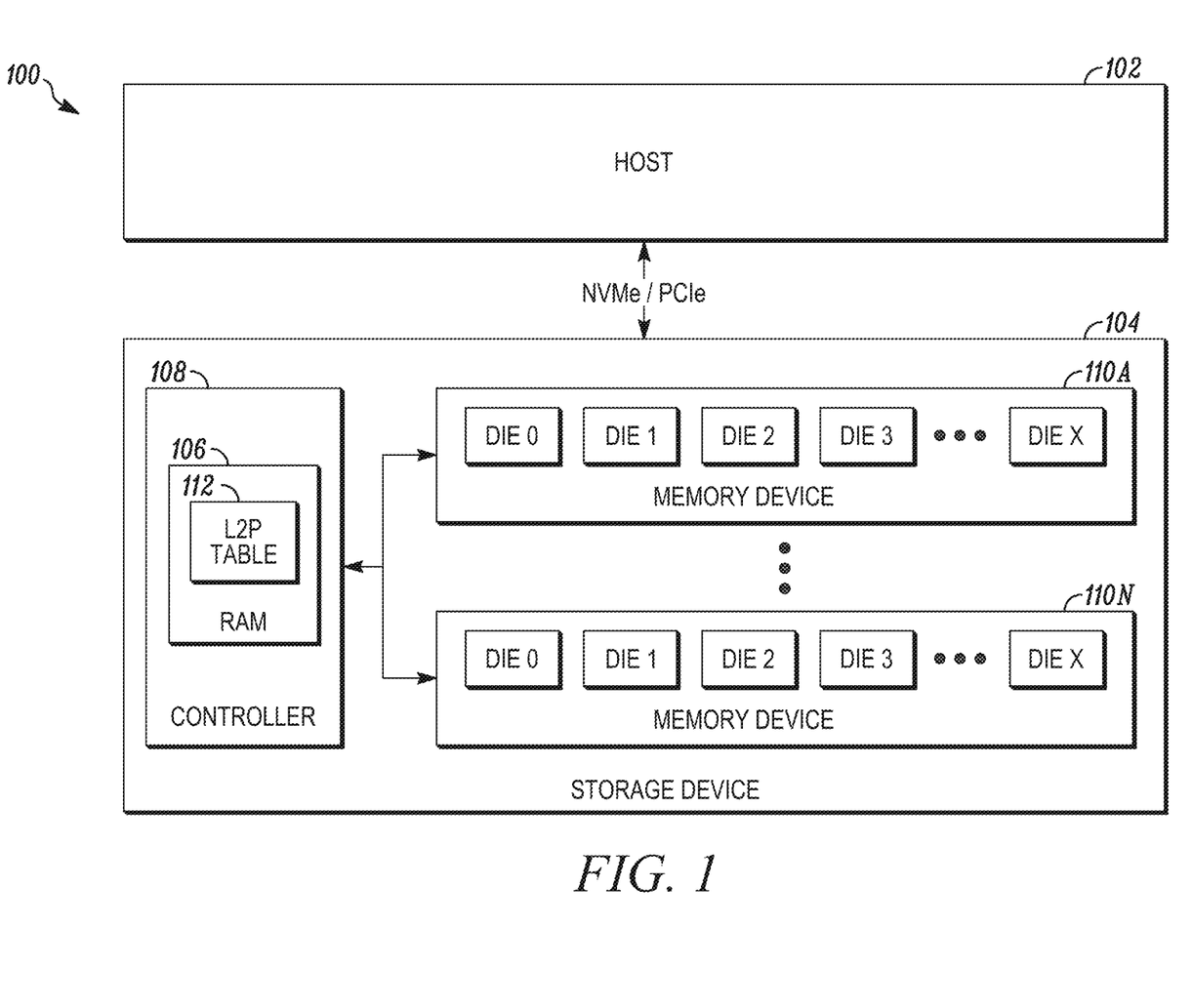
FIG. 1 is a schematic block diagram of an example system in accordance with some implementations.

FIG. 1 is a schematic block diagram of an example system in accordance with some implementations. System 100 includes a host 102 and a storage device 104. Host 102 may transmit commands to read or write data to storage device 104. Host 102 and storage device 104 may be in the same physical location as components on a single computing device or on different computing devices that are communicatively coupled. Storage device 104, in various implementations, may be disposed in one or more different locations relative to the host 102 and storage device 104 may communicate with host 102 over a peripheral component interconnect express (PCIe) protocol and the like. Host 102 may include additional components (not shown in this figure for the sake of simplicity).

Storage device 104 may include a random-access memory (RAM) 106, a controller 108, one or more non-volatile memory devices 110a-110n (referred to herein as the memory device(s) 110). Storage device 104 may be, for example, a solid-state drive (SSD). RAM 106 may be static RAM (SRAM) or dynamic RAM (DRAM) that may be used to store information including a logical to physical (L2P) table 112 used on storage device 104.

Controller 108 may interface with host 102 and process foreground operations including instructions transmitted from host 102. For example, controller 108 may read data from and/or write to memory device 110 based on instructions received from host 102. Controller 108 may also execute background operations to manage resources on memory device 110. For example, controller 108 may monitor memory device 110 and may execute garbage collection and other relocation functions per internal relocation algorithms to refresh, recycle, and/or relocate the data on memory device 110.

Memory device 110 may be flash based. For example, memory device 110 may be a NAND or NOR flash memory that may be used for storing host and control data over the operational life of memory device 110. Memory device 110 may include multiple dies (for example, DIE 0-DIE X) for storing the data. Data may be stored in blocks on the dies in various formats, with the formats being defined by the number of bits that may be stored per memory cell. Memory device 110 may be included in storage device 104 or may be otherwise communicatively coupled to storage device 104.

When controller 108 receives a read or write request from host 102, controller 108 may retrieve one or more logical block address(es) (LBAs) from the host read or write request and may map a LBA in the host request to a physical block address on memory device 110. In the case of a host write request or a write operation initiated by controller 108 during a background operation, when controller 108 programs data on memory device 110, controller 108 may map the LBA for a unit of data (for example, 512 bytes) to a physical address on memory device 110 and may store the mapping in, for example, a 4-byte entry in L2P table 112 (the mapping entry in L2P table 112 may be referred to herein as a uRun).

Prior to reading data from memory device 110, controller 108 may search L2P table 112 for the LBA associated with the data being read. To ensure that controller 108 may quickly retrieve a L2P mapping for a read request, an array of uRuns may be stored in a uItem and a uItem may include at least one mSet. Using the example where there may be a 4-byte mapping entry in L2P table 112 for a 512-byte data unit, a mSet in L2P table 112 may include mapping entries/uRuns for 32 megabytes (MB) of data in 32K in L2P table 112. MSets may be stored in regions and each time an L2P mapping in a region is updated, a uRun may be created in that region. For example, if the data associated with a LBA in region 0 is relocated during a background operation, a uRun in region 0 may be created to reflect a new L2P mapping.

When an L2P mapping is updated/created, controller 108 may increment a global/first counter associated with the uLayer. Controller 108 may also increment a local/second counter associated with a region including the updated/new mapping. The global and local counters may be timestamp counters. Based, for example, on the workload on storage device 104 when the available space in the uLayer or in a region reaches a predefined space threshold, controller 108 may select regions with the highest number of new uRuns for consolidation. For example, when the available space in a region can store less than a predefined number (for example, two new uRuns), controller 108 may select regions with the highest number of new uRuns for consolidation The highest number of new uRuns may be determined by a consolidation threshold (for example, two or more new uRuns in a region) and regions with a number of new uRuns above the consolidation threshold may be selected for consolidation. During consolidation, controller 108 may copy the latest or most up-to-date L2P mapping in a selected region to memory device 110. After consolidating a region, controller 108 may reset the local counter associated with the consolidated region and free space in the uLayer that was occupied by the region prior to the consolidation.

In an implementation, during background operations, controller 108 may execute relocation functions per internal relocation algorithms. In some cases, storage device 104 may also include a background threshold (for example, a predefined value) which may be used to determine if background consolidated is needed. If based on the background threshold controller 108 determines that background consolidation is needed, after or as part of the background operations, controller 108 may identify region(s) including trapped mSets by comparing the difference between the global counter and the local counter with a counter threshold. The counter threshold may be based on the workload of storage device 104. If the difference is greater than the counter threshold, controller 108 may determine that the region includes trapped mSets. When controller 108 determines that one or more regions include trapped mSets, controller 108 may select the region(s) identified as including trapped mSets and may trigger consolidation of the mSets in the trapped region(s). After the consolidation, controller 108 may reset the local counter(s) associated with the region(s) identified as including trapped mSets. This may free up space in uLayer during background operations and reduce the number of consolidations that may be performed during foreground operations, thus improving performance and write amplification on storage device 104.

Depending on the workload from host 102, storage device 104 may not have sufficient time to execute background operations and/or background consolidation. Storage device 104 may include a foreground threshold (for example, a predefined value) that may be used to identify region(s) including trapped mSets that may be consolidated during foreground operations. The foreground threshold may be larger than the background threshold to ensure that consolidation of region(s) including trapped mSets does not affect consolidation of regions including mSets that are not trapped and/or the performance of storage device.

When controller 108 receives a host or relocation write request, controller 108 may calculate the mSet for the write request and update the region including the mSet. During a foreground operation, as needed as determined by, for example, the foreground threshold, controller 108 may determine if consolidation is needed. If controller 108 determines that consolidation is needed, controller 108 may identify region(s) including trapped mSets based on the difference between the global counter and the local counter as compared with the counter threshold. If the difference is greater than the counter threshold, controller 108 may determine that the region includes trapped mSets. Controller 108 may select the region(s) with trapped mSets, consolidate them, and reset the local counter for a consolidated region.

Controller 108 may maintain the most up-to-date copy of the L2P table in RAM 106 after consolidation. The releasing of trapped mSets during foreground or background operation may reduce the write amplification of the blocks in memory device 110 holding the L2P mappings and increase the performance of storage device 104. Furthermore, the releasing of trapped mSets during foreground or background operation may free up space on RAM 106 to be used for new write operations.

Storage device 104 may perform these processes based on a processor, for example, controller 108 executing software instructions stored by a non-transitory computer-readable medium, such as storage component 110. As used herein, the term "computer-readable medium" refers to a non-transitory memory device. Software instructions may be read into storage component 110 from another computer-readable medium or from another device. When executed, software instructions stored in storage component 110 may cause controller 108 to perform one or more processes described herein. Additionally, or alternatively, hardware circuitry may be used in place of or in combination with software instructions to perform one or more processes described herein. Thus, implementations described herein are not limited to any specific combination of hardware circuitry and software. System 100 may include additional components (not shown in this figure for the sake of simplicity). FIG. 1 is provided as an example. Other examples may differ from what is described in FIG. 1.

Figure 2:
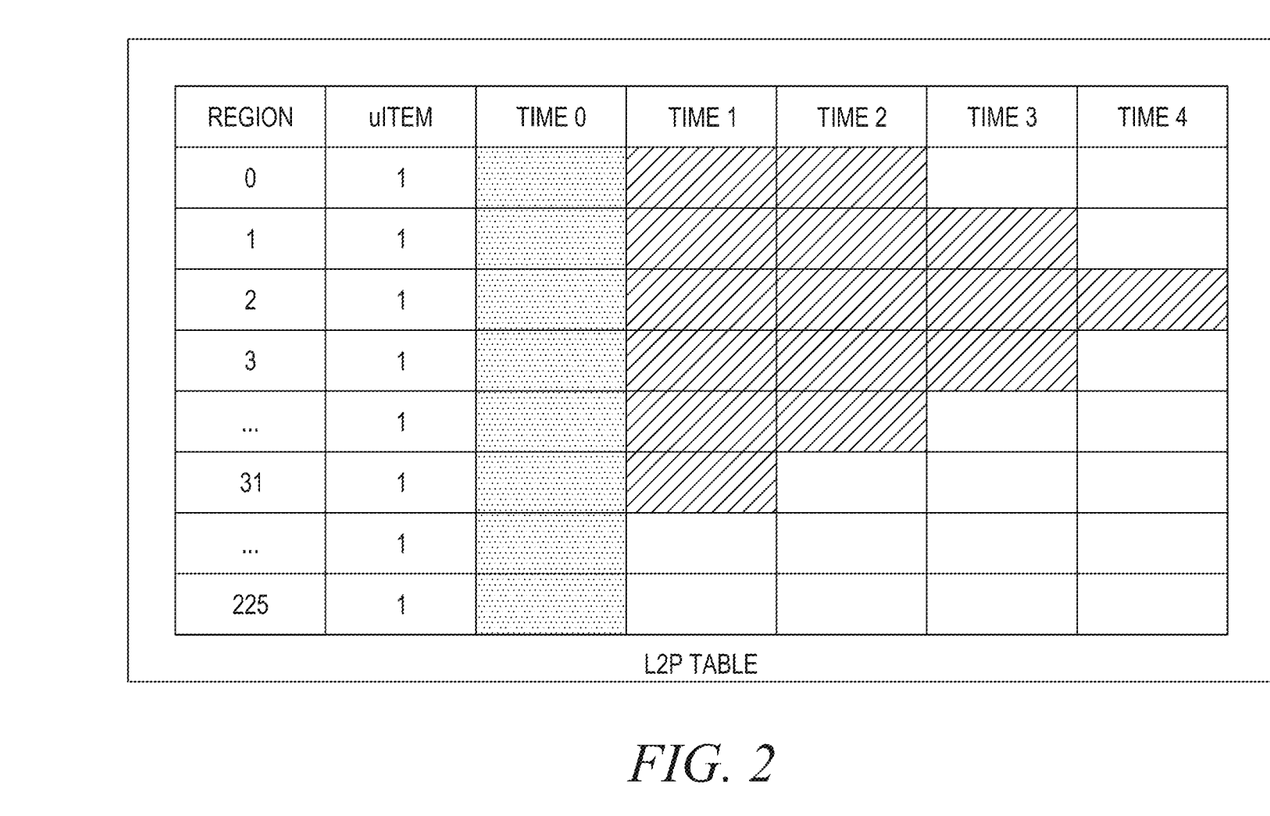
FIG. 2 is a block diagram of an exemplary layout of an L2P table in accordance with some implementations.

FIG. 2 is a block diagram of an exemplary layout of an L2P table in accordance with some implementations. L2P table 112 may be divided into regions (i.e., regions 0-255) and each region may store a uItem (i.e., an array of uRuns). FIG. 2 shows an example where during an initial period, the entire capacity of storage device may be sequentially written to. As such, at Time 0 each region 0-255 in L2P table 112 may include a mSet showing the L2P mappings for a given range of data, as shown be the dotted shading in regions 0-255. If at Times 1-4 the data in a shorter range (for example, a 1 gigabyte (GB) range covering mSets 0-32) is updated, uRuns associated with the updates may be created in ranges 0-31, as shown be the diagonal shading in those regions.

Based, for example, on the workload on storage device 104 when the available space in the uLayer reaches a predefined space threshold, controller 108 may select the regions with the highest number of new uRuns for consolidation. For example, when there is no available space in a region (for example, region 2) to store a new uRuns, controller 108 may select the regions with the highest number of new uRuns for consolidation. For example, controller 108 may determine that the regions with at least one new uRun are the regions with the highest number of new uRuns. As such, controller 108 may select regions 0-31 for consolidation. After consolidating regions 0-31, controller 108 may reset the local counters associated with regions 0-31, update the mSets in regions 0-31 to include all the updated uRuns and free space in the uLayer that was occupied by the new uRuns in regions 0-31 prior to the consolidation. As indicated above FIG. 2 is provided as an example. Other examples may differ from what is described in FIG. 2.

Figure 3:
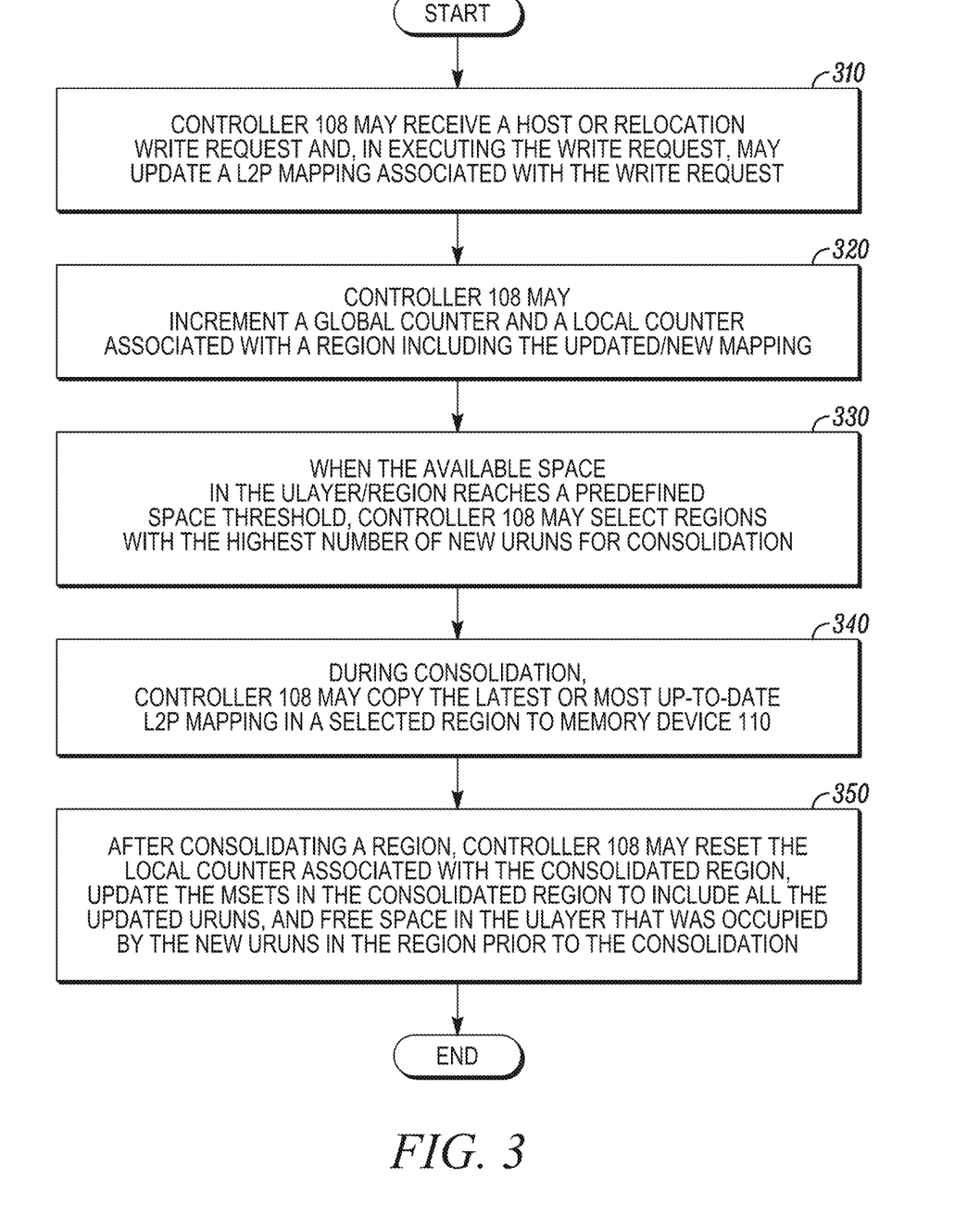
FIG. 3 is a flow diagram for consolidating entries in an L2P table in accordance with some implementations.

FIG. 3 is a flow diagram for consolidating entries in an L2P table in accordance with some implementations. At 310, controller 108 may receive a host or relocation write request and, in executing the write request, may update a L2P mapping associated with the write request. At 320, controller 108 may increment a global counter and a local counter associated with a region including the updated/new mapping. At 330, when the available space in the uLayer/region reaches a predefined space threshold, controller 108 may select regions with the highest number of new uRuns for consolidation. At 340, during consolidation, controller 108 may copy the latest or most up-to-date L2P mapping in a selected region to memory device 110. At 350, after consolidating a region, controller 108 may reset the local counter associated with the consolidated region, update the mSets in the consolidated region to include all the updated uRuns, and free space in the uLayer that was occupied by the new uRuns in region prior to the consolidation. As indicated above FIG. 3 is provided as an example. Other examples may differ from what is described in FIG. 3.

Figure 4:
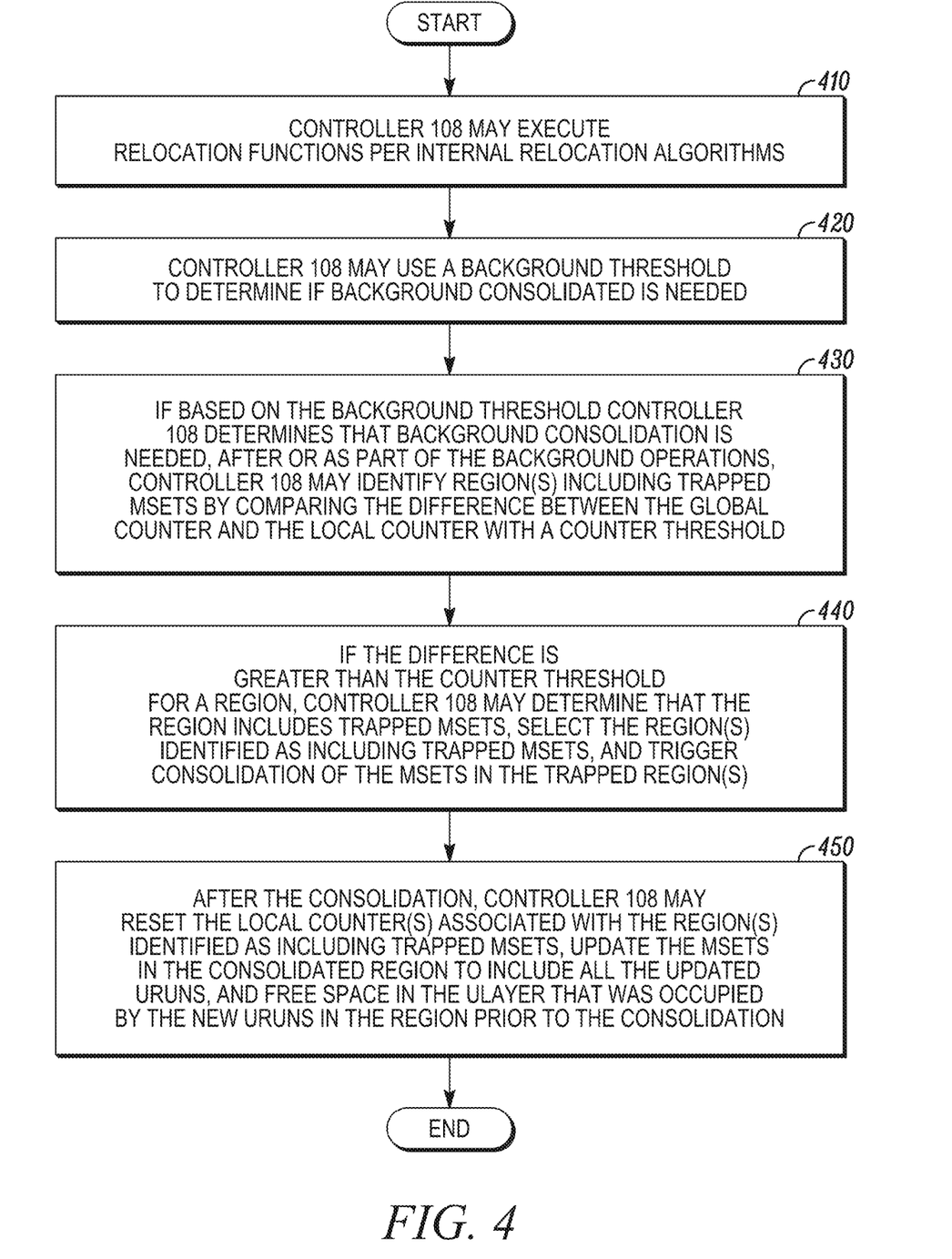
FIG. 4 is a flow diagram for consolidating entries in an L2P table during a background operation in accordance with some implementations.

FIG. 4 is a flow diagram for consolidating entries in an L2P table during a background operation in accordance with some implementations. At 410, controller 108 may execute relocation functions per internal relocation algorithms. At 420, controller 108 may use a background threshold to determine if background consolidated is needed. At 430, if based on the background threshold controller 108 determines that background consolidation is needed, after or as part of the background operations, controller 108 may identify region(s) including trapped mSets by comparing the difference between the global counter and the local counter with a counter threshold. At 440, if the difference is greater than the counter threshold for a region, controller 108 may determine that the region includes trapped mSets, select the region(s) identified as including trapped mSets, and trigger consolidation of the mSets in the trapped region(s). At 450, after the consolidation, controller 108 may reset the local counter(s) associated with the region(s) identified as including trapped mSets, update the mSets in the consolidated region to include all the updated uRuns, and free space in the uLayer that was occupied by the new uRuns in the region prior to the consolidation. As indicated above FIG. 4 is provided as an example. Other examples may differ from what is described in FIG. 4.

Figure 5:
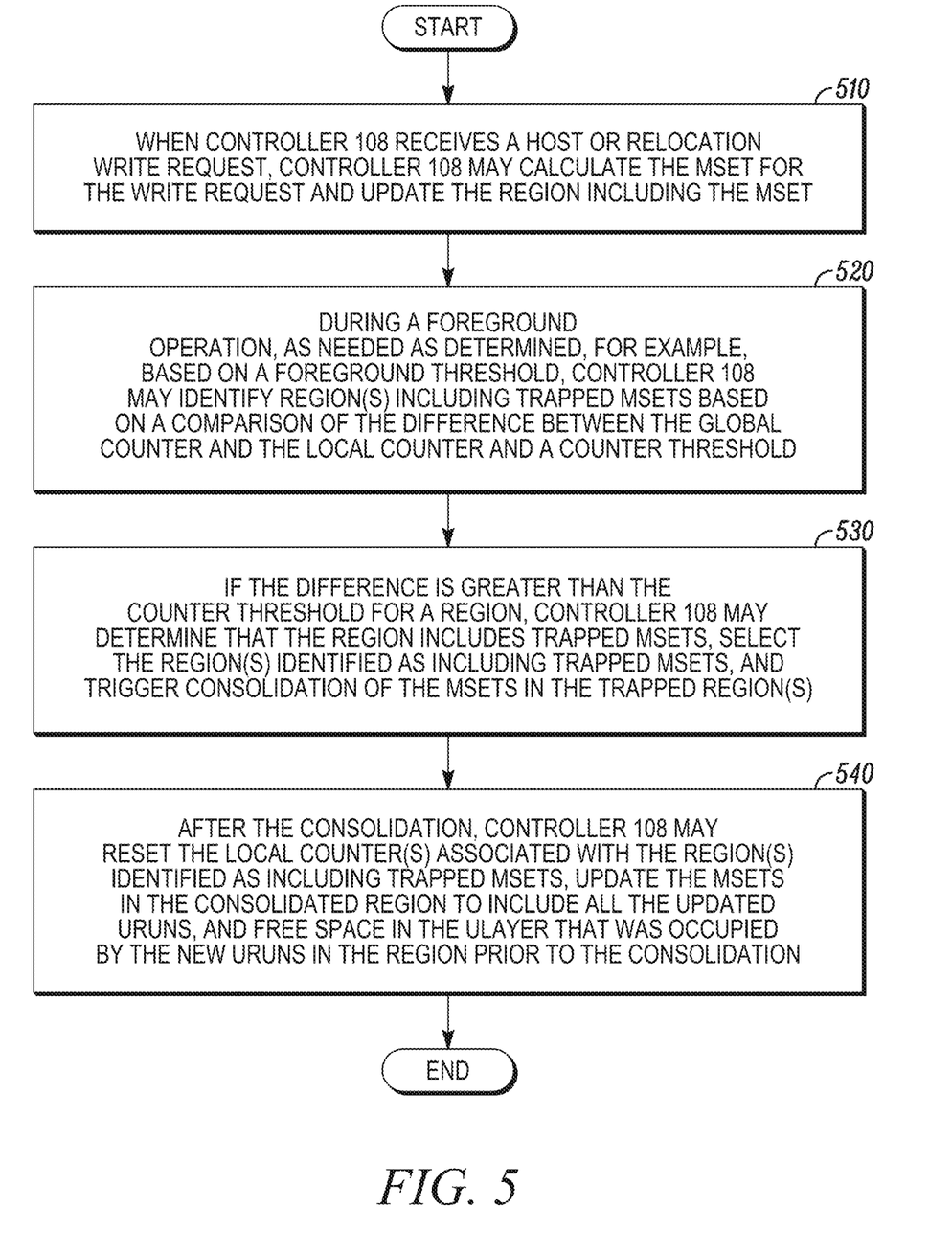
FIG. 5 is a flow diagram for consolidating entries in an L2P table during foreground operations in accordance with some implementations.

FIG. 5 is a flow diagram for consolidating entries in an L2P table during foreground operations in accordance with some implementations. At 510, when controller 108 receives a host or relocation write request, controller 108 may calculate the mSet for the write request and update the region including the mSet. At 520, during a foreground operation, as needed as determined, for example, based on a foreground threshold, controller 108 may identify region(s) including trapped mSets based on a comparison of the difference between the global counter and the local counter and a counter threshold. At 530, if the difference is greater than the counter threshold for a region, controller 108 may determine that the region includes trapped mSets, select the region(s) identified as including trapped mSets, and trigger consolidation of the mSets in the trapped region(s). At 540, after the consolidation, controller 108 may reset the local counter(s) associated with the region(s) identified as including trapped mSets, update the mSets in the consolidated region to include all the updated uRuns, and free space in the uLayer that was occupied by the new uRuns in the region prior to the consolidation. As indicated above FIG. 5 is provided as an example. Other examples may differ from what is described in FIG. 5.

Figure 6:
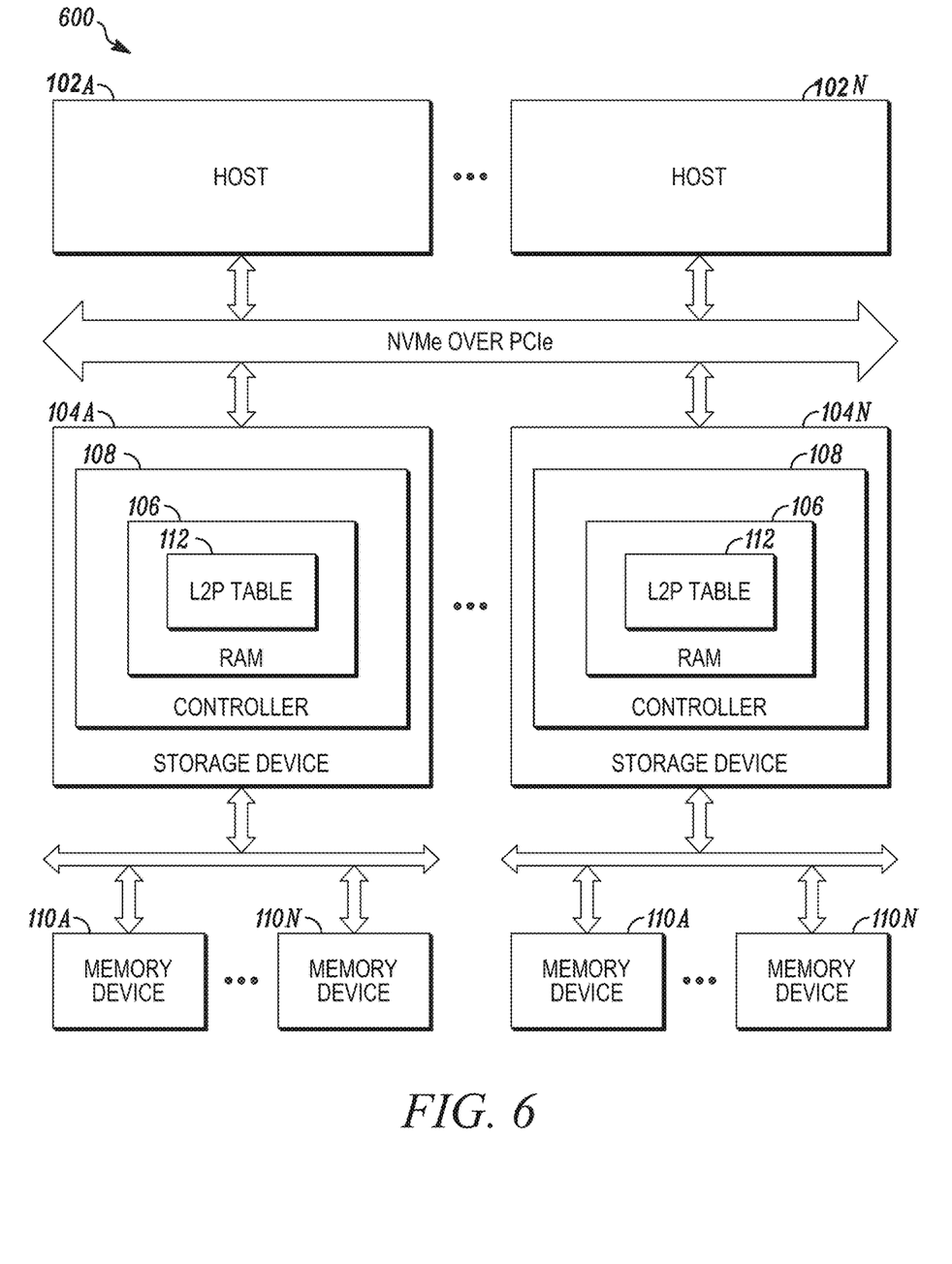
FIG. 6 is a diagram of an example environment in which systems and/or methods described herein are implemented.

FIG. 6 is a diagram of an example environment in which systems and/or methods described herein are implemented. As shown in FIG. 6, Environment 600 may include hosts 102-102*n* (referred to herein as host(s) 102), and one or more storage devices 104*a*-104*n* (referred to herein as storage device(s) 104). Storage device 104 may include a controller 108 to consolidate mSets that are trapped in regions in L2P table 112. Hosts 102 and storage devices 104 may communicate via Non-Volatile Memory Express (NVMe) over peripheral component interconnect express (PCI Express or PCIe), SD, or the like.

Devices of Environment 600 may interconnect via wired connections, wireless connections, or a combination of wired and wireless connections. For example, the network in FIG. 6 may include NVMe over Fabric (NVMe-oF) Internet Small Computer Systems Interface (iSCSI), Fibre Channel (FC), Fibre Channel Over Ethernet (FCOE) connectivity and any another type of next-generation network and storage protocols, a local area network (LAN), a wide area network (WAN), a metropolitan area network (MAN), a private network, an ad hoc network, an intranet, the Internet, a fiber optic-based network, a cloud computing network, or the like, and/or a combination of these or other types of networks.

The number and arrangement of devices and networks shown in FIG. 6 are provided as an example. In practice, there may be additional devices and/or networks, fewer devices and/or networks, different devices and/or networks, or differently arranged devices and/or networks than those shown in FIG. 6. Furthermore, two or more devices shown in FIG. 6 may be implemented within a single device, or a single device shown in FIG. 6 may be implemented as multiple, distributed devices. Additionally, or alternatively, a set of devices (e.g., one or more devices) of Environment 600 may perform one or more functions described as being performed by another set of devices of Environment 600.

Figure 7:
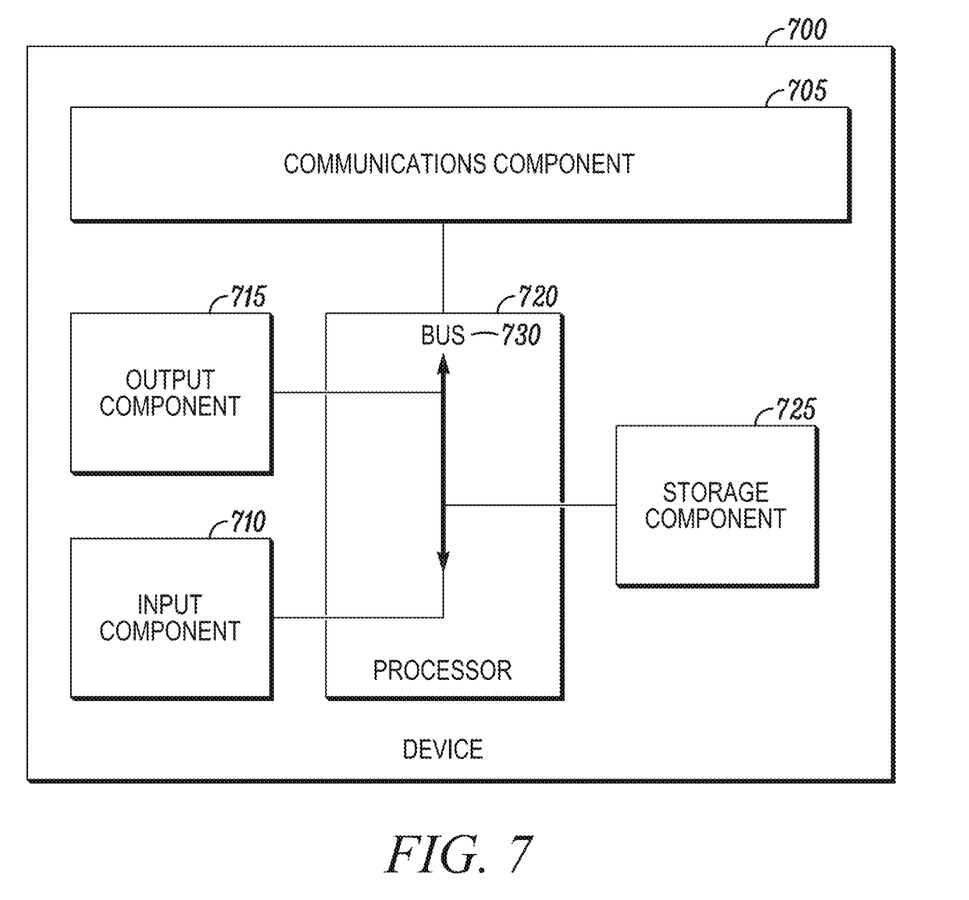
FIG. 7 is a diagram of example components of one or more devices of FIG. 1.

FIG. 7 is a diagram of example components of one or more devices of FIG. 1. In some implementations, host 102 may include one or more devices 700 and/or one or more components of device 700. Device 700 may include, for example, a communications component 705, an input component 710, an output component 715, a processor 720, a storage component 725, and a bus 730. Bus 730 may include components that enable communication among multiple components of device 700, wherein components of device 700 may be coupled to be in communication with other components of device 700 via bus 730.

Input component 710 may include components that permit device 700 to receive information via user input (e.g., keypad, a keyboard, a mouse, a pointing device, and a network/data connection port, or the like), and/or components that permit device 700 to determine the location or other sensor information (e.g., an accelerometer, a gyroscope, an actuator, another type of positional or environmental sensor). Output component 715 may include components that provide output information from device 700 (e.g., a speaker, display screen, and network/data connection port, or the like). Input component 710 and output component 715 may also be coupled to be in communication with processor 720.

Processor 720 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 may include one or more processors capable of being programmed to perform a function. Processor 720 may be implemented in hardware, firmware, and/or a combination of hardware and software.

Storage component 725 may include one or more memory devices, such as random-access memory (RAM 106), read-only memory (ROM), and/or another type of dynamic or static storage device (e.g., a flash memory, a magnetic memory, and/or optical memory) that stores information and/or instructions for use by processor 720. A memory device may include memory space within a single physical storage device or memory space spread across multiple physical storage devices. Storage component 725 may also store information and/or software related to the operation and use of device 700. For example, storage component 725 may include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, CXL device and/or another type of non-transitory computer-readable medium, along with a corresponding drive.

Communications component 705 may include a transceiver-like component that enables device 700 to communicate with other devices, such as via a wired connection, a wireless connection, or a combination of wired and wireless connections. The communications component 705 may permit device 700 to receive information from another device and/or provide information to another device. For example, communications component 705 may include an Ethernet interface, an optical interface, a coaxial interface, an infrared interface, a radio frequency (RF) interface, a universal serial bus (USB) interface, a Wi-Fi interface, and/or a cellular network interface that may be configurable to communicate with network components, and other user equipment within its communication range. Communications component 705 may also include one or more broadband and/or narrowband transceivers and/or other similar types of wireless transceiver configurable to communicate via a wireless network for infrastructure communications. Communications component 705 may also include one or more local area network or personal area network transceivers, such as a Wi-Fi transceiver or a Bluetooth transceiver.

Device 700 may perform one or more processes described herein. For example, device 700 may perform these processes based on processor 720 executing software instructions stored by a non-transitory computer-readable medium, such as storage component 725. As used herein, the term "computer-readable medium" refers to a non-transitory memory device. Software instructions may be read into storage component 725 from another computer-readable medium or from another device via communications component 705. When executed, software instructions stored in storage component 725 may cause processor 720 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

The foregoing disclosure provides illustrative and descriptive implementations but is not intended to be exhaustive or to limit the implementations to the precise form disclosed herein. One of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of present teachings.

As used herein, the term "component" is intended to be broadly construed as hardware, firmware, and/or a combination of hardware and software. It will be apparent that systems and/or methods described herein may be implemented in different forms of hardware, firmware, and/or a combination of hardware and software.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related items, unrelated items, and/or the like), and may be used interchangeably with "one or more." The term "only one" or similar language is used where only one item is intended. Further, the phrase "based on" is intended to mean "based, at least in part, on" unless explicitly stated otherwise.

Moreover, in this document, relational terms such as first and second, top and bottom, and the like, may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", or "contains . . . a" does not, without more constraints, preclude the existence of additional identical elements in the process, method, article, or apparatus that comprises, has, includes, contains the element. The terms "substantially", "essentially", "approximately", "about" or any other version thereof, are defined as being close to as understood by one of ordinary skill in the art, and in one non-limiting implementation, the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way but may also be configured in ways that are not listed.

We claim:

1. A storage device to optimize consolidation of a logical to physical (L2P) table, the storage device comprises:
a memory device divided into blocks;
a volatile memory including a L2P table to store mappings of logical block addresses associated with data to physical block addresses on the memory device; and
a controller to execute a request to store data to the memory device, map a logical block address associated with the data to a physical block address on the memory device, add a new L2P mapping to the L2P table and increment a first counter and a second counter when data is one of added to and moved on the memory device, select a region in the L2P table and associated with the second counter for consolidation when a criterion is met based on values of the first counter, the second counter, and a counter threshold, and consolidate the region.

2. The storage device of claim 1, wherein the first counter is associated with a space in the volatile memory and the first counter is incremented when the new L2P mapping is added to the L2P table.

3. The storage device of claim 1, wherein the second counter is a local counter associated with the region and the second counter is incremented when the new L2P mapping is added to the region.

4. The storage device of claim 1, wherein the first counter and the second counter are timestamp counters.

5. The storage device of claim 1, wherein the controller identifies the region for consolidation based on a background threshold, wherein in executing the criterion, the controller compares a difference between the first counter and the second counter with the counter threshold, and if the difference is greater than the counter threshold, determines that the region includes a trapped mSet and selects the region for consolidation as part of a background operation.

6. The storage device of claim 1, wherein the controller identifies the region for consolidation based on a foreground threshold, wherein in executing the criterion, the controller compares a difference between the first counter and the second counter with a counter threshold, and if the difference is greater than the counter threshold, determines that the region includes a trapped mSet and selects the region for consolidation as part of a foreground operation.

7. The storage device of claim 6, wherein the foreground threshold is larger than a background threshold.

8. The storage device of claim 1, wherein the counter threshold is based on workload of the storage device.

9. The storage device of claim 1, wherein the controller resets the second counter after consolidation.

10. The storage device of claim 1, wherein the controller selects the region for consolidation based on a space threshold and when a number of updates in the region is greater than a consolidation threshold.

11. A method for optimizing consolidation of a logical to physical (L2P) table in a storage device, the storage device comprises a controller to execute the method comprising:
executing a request to store data to a memory device;
mapping a logical block address in the data to be stored on the memory device to a physical block address on the memory device;
adding a new L2P mapping to a L2P table stored in a volatile memory on the storage device;
incrementing a first counter and a second counter when data is one of added to and moved on the memory device;
selecting a region in the L2P table and associated with the second counter for consolidation when a criterion is met based on values of the first counter, the second counter, and a counter threshold; and
consolidating the region.

12. The method of claim 11, further comprising associating the first counter with a space in the volatile memory and incrementing the first counter when the new L2P mapping is added to the L2P table.

13. The method of claim 11, further comprising associating the second counter with the region and incrementing the second counter when the new L2P mapping is added to the region.

14. The method of claim 11, further comprising identifying the region for consolidation based on a background threshold, wherein in executing the criterion, the method comprises comparing a difference between the first counter and the second counter with the counter threshold, and if the difference is greater than the counter threshold, determining that the region includes a trapped mSet, and selecting the region for consolidation as part of a background operation.

15. The method of claim 11, further comprising identifying the region for consolidation based on a foreground threshold, wherein in executing the criterion, the method comprises comparing a difference between the first counter and the second counter with the counter threshold, and if the difference is greater than the counter threshold, determining that the region includes a trapped mSet, and selecting the region for consolidation as part of a foreground operation.

16. The method of claim 11, further comprising resetting the second counter after consolidation.

17. The method of claim 11, further comprising selecting the region for consolidation based on a space threshold and when a number of updates in the region is greater than a consolidation threshold.

18. A method for optimizing consolidation of a logical to physical (L2P) table in a storage device, the storage device comprises a controller to execute the method comprising:
executing a request to store data to a memory device;
mapping a logical block address in the data to be stored on the memory device to a physical block address on the memory device;
adding a new L2P mapping to a L2P table stored in a volatile memory on the storage device;
incrementing a global counter and a local counter when data is one of added to and moved on the memory device;
during a background operation, identifying a region for consolidation based on a background threshold, comparing a difference between the global counter and the local counter associated with the region with a counter threshold, and if the difference is greater than the counter threshold, determining that the region includes a trapped mSet, and selecting the region for consolidation as part of the background operation;
during a foreground operation identifying the region for consolidation based on a foreground threshold, comparing a difference between the global counter and the local counter associated with the region with the counter threshold, and if the difference is greater than the counter threshold, determining that the region includes a trapped mSet, and selecting the region for consolidation as part of the foreground operation; and
consolidating the region.

19. The method of claim 18, wherein the foreground threshold is larger than a background threshold.

20. The method of claim 18, further comprising selecting the region for consolidation based on a space threshold and when a number of updates in the region is greater than a consolidation threshold.

* * * * *